May 20, 1952 S. LIGHTER Re. 23,501

BOTTLE CARRIER

Original Filed Oct. 28, 1946 3 Sheets-Sheet 1

INVENTOR.
Stephen Lighter
BY
Carr & Carr & Gravely,
ATTORNEYS.

BOTTLE CARRIER

Original Filed Oct. 28, 1946 3 Sheets-Sheet 2

INVENTOR.
Stephen Lighter
BY
Carr & Carr & Gravely,
ATTORNEYS.

BOTTLE CARRIER

Original Filed Oct. 28, 1946 3 Sheets-Sheet 3

INVENTOR.
Stephen Lighter
BY
Carr & Carr & Gravely,
ATTORNEYS.

Reissued May 20, 1952

Re. 23,501

UNITED STATES PATENT OFFICE 23,501

BOTTLE CARRIER

Stephen Lighter, Whitefish Bay, Wis., assignor to Gaylord Container Corporation, St. Louis, Mo.

Original No. 2,535,741, dated December 26, 1950, Serial No. 706,196, October 28, 1946. Application for reissue December 14, 1951, Serial No. 261,708

8 Claims. (Cl. 229—28)

Matter enclosed in heavy brackets [ ] appears in the original patent but forms no part of this reissue specification; matter printed in italics indicates the additions made by reissue.

This invention relates generally to improvements in the manufacture of receptacles for holding groups of articles in orderly and prearranged position, and relates more specifically to improvements in the construction of carriers for facilitating storage or transportation of a predetermined number of bottles or the like usually nested in upright or erect condition.

The primary object of the present invention is to provide an improved carrier for bottles or the like, which is simple but durable in construction, and which is moreover highly effective in use.

Many different types of bottle carriers for holding a group of beverage laden bottles or the like in orderly and upright position and for facilitating manual transportation of such groups, have heretofore been proposed and used commercially with varying degrees of success; and some of these prior devices have been formed primarily of sheet metal or metal wire, while others have been formed of fibrous sheet material such as cardboard or paper. Since these bottle carriers usually involve only temporary assemblages adapted to facilitate initial packing, distribution and transportation of the liquid laden bottles from the filling zone or market to the places of utilization of the contents, and are thereafter frequently discarded, the cost of the metal devices for such purposes is prohibitive. It is however a primary requirement that such carrier devices be inexpensive and sufficiently sturdy in structure to insure safe transportation of the bottles, and the bottle laden carriers should in some cases be capable of being stacked upon each other in stable and compact arrangement; and none of the multitude of prior cardboard bottle carriers have proven entirely satisfactory since all of them lacked one or more of these important qualifications.

It is therefore an object of my invention to provide an improved bottle carrier adapted to be sturdily constructed of relatively inexpensive materials, and which meets all of the above-mentioned primary requirements and which also possesses many other desirable features.

Another more specific object of this invention is to provide an improved cardboard carrier for bottles or the like, which is adapted to be formed of a unitary blank and conveniently assembled to provide a receptacle wherein the articles may be readily inserted and are thereafter firmly retained in neatly pre-arranged and grouped condition.

A further specific object of the invention is to provide an improved beverage filled bottle carrier adapted to maintain a group of the bottles in segregated and orderly position, and to most effectively transmit the load to the carrying handle, thus insuring maximum safety during transportation.

Still another specific object of the present invention is to provide a carrier for a group of elongated upright articles such as bottles, which may be readily collapsed and distended and locked in distended or assembled condition, and which may also be manufactured at moderate cost with the aid of relatively standard and simple equipment.

An additional specific object of my invention is to provide an improved bottle carrier formed primarily of light but strong cardboard to provide a rigid assemblage, and wherein the carrying handle may be conveniently adjusted to permit unobstructed stacking of the bottle laden carriers upon each other without handle interference.

Another specific object of the invention is to provide an attractive carrier for bottles and similar articles, which presents an abundance of surface area for advertising and merchandising purposes, while still most effectively and safely confining the articles in either visible or desirably concealed condition.

These and other specific objects and advantages of the invention will be apparent from the following detailed description.

A clear conception of the novel features involved, and of the mode of constructing and utilizing several types of bottle carriers embodying the same, may be had by referring to the drawings accompanying and forming a part of this specification wherein like reference characters designate the same or similar parts in the various views.

While the invention has been shown and described herein as being advantageously applicable to cardboard assemblages for facilitating the nesting and carriage of a group of six beverage laden bottles of a particular type, it is not my desire or intent to thereby unnecessarily limit the scope or restrict the utility of the improved features.

Figure 1:
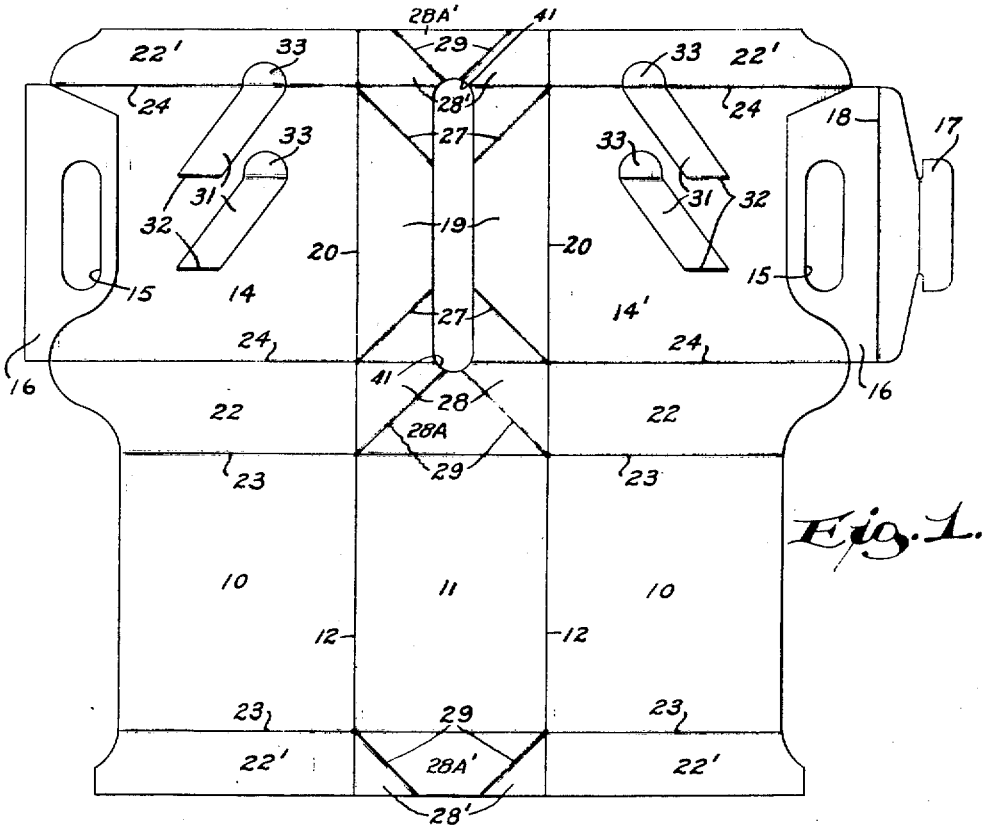
Fig. 1 is a plan view of a typical cardboard blank which may be utilized in my improved bottle carrying assemblage.

Referring to Figs. 1 to 6 inclusive of the drawings, the typical cardboard bottle carrier shown therein is formed of a unitary blank, a plan view of which is illustrated in Fig. 1. This blank consists of a pair of similar rectangular outer wall forming panels 10 which are swingably connected to an outer bottom forming plate 11 along score lines 12; a pair of approximately rectangular inner wall forming panels 14, 14' each provided with an upper hand opening 15 and with a reenforcing handle forming plate 16 surrounding the opening, the panel 14' also having a locking tongue 17 foldably connected to its uppermost edge along a score line 18, and the lower edges of the two panels 14, 14' being swingably connected to a centrally divided inner bottom forming plate 19 along score lines 20; and four end wall forming panels 22, 22' foldably connected to the outer and inner wall panels 10, 14 respectively along score lines 23, 24, the panels 22' being formed of overlapping sections adapted to be adhesively united along areas 25 in order to assemble the blank. The centrally divided inner bottom plate 19 is provided with diagonal fold lines 27 and the spaces between the adjacent ends of the bottom 11, 19 and between the inner ends of the end panels 22, 22' are filled with folding sections 28, 28', *28A, and 28A'* having similarly inclined fold lines 29 impressed therein. [and] *As shown in Fig. 1, the fold lines 29 bisect the angle formed by the inner ends of the end panel 22, and 22' and the adjacent ends of the body plate 11, forming a bottom reinforcing structure comprising end reinforcing sections 28 and 28' which are articulated with the inner ends of the end panels 22, 22' and intermediate inner folding sections 28A and 28A' which are articulated with the ends of the bottom plate 11 and with the end foldable sections 28 and 28'. As the carrier is assembled, the intermediate folding sections 28A and 28A' are folded inwardly flatwise over the adjacent end portions of the bottom plate 11 and the end folding sections 28 and 28' are simultaneously folded inwardly flatwise over said intermediate sections 28A and 28A', thereby forming a two-ply reinforcement to the bottom plate 11 at the ends of each of the bottle receiving compartments. The inclined fold lines 29 are disposed at an angle of substantially 45° to each of said lines of articulation.*

Figure 2:
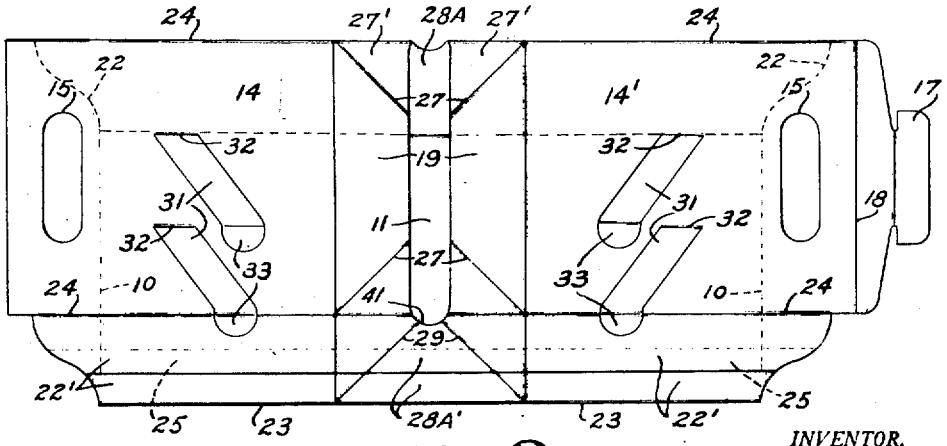
Fig. 2 is a plan view of the same blank assembled but in flatly collapsed condition.

*The portions of the reinforcing end sections 28 and 28' and the intermediate reinforcing sections 28A and 28A' opposite the line of articulation between the ends of the bottom plate 11 and sections 28A and 28A' may be cut out in any suitable manner, for example, as shown at 41, Figs. 1 and 2, to facilitate ease of assembling the carrier.* The inner wall forming panels 14, 14' are each provided with a pair of integral parallel inclined partition forming strips 31, each of which is foldably connected to its carrying wall panel by a score line 32 and is provided with an integral end tab 33 adapted to be adhesively connected to the adjacent outer wall panel 10, as clearly shown in Figs. 3 to 6 inclusive.

Figure 4:
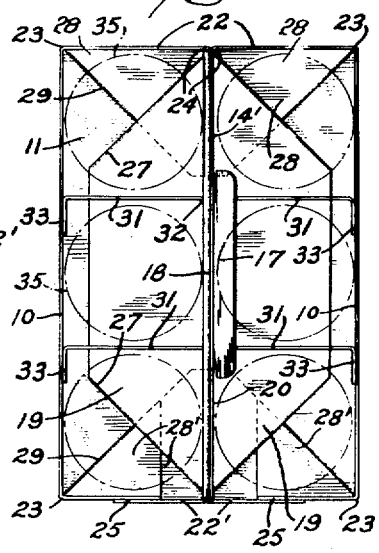
Fig. 4 is a top view of the finally distended or assembled carton and carrier, showing the positions of the nested bottles in dot-and-dash lines.
Figure 5:
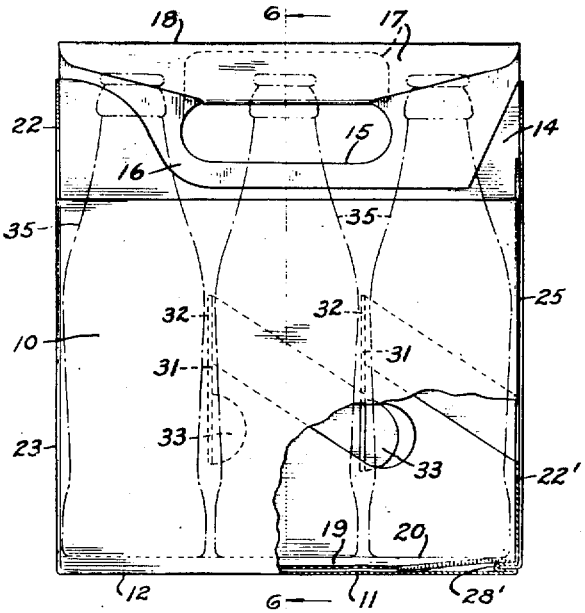
Fig. 5 is a part sectional side elevation of the distended carrier showing the positions of the bottles in dot-and-dash lines, and also having a portion of the front wall broken away in order to reveal internal structure.
Figure 6:
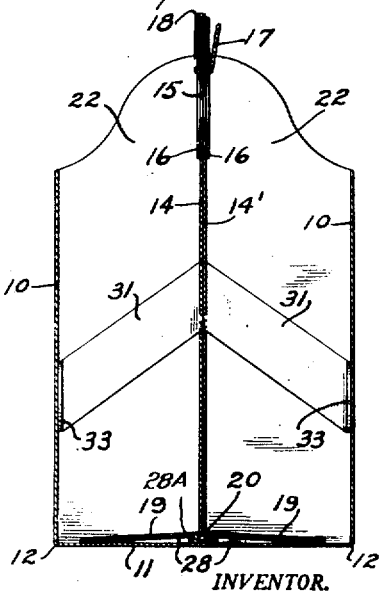
Fig. 6 is a transverse central vertical section through the finally distended bottle carrier, the section having been taken along the line 6—6 of Fig. 5.

The outer walls or panels 10 of the assembled carrier are preferably of lower height than the inner walls or panels 14, 14', in order to expose to view a considerable upper portion of a group of bottles 35 when nested within the carrier, and the reenforcing handle plates 16 may either be formed integral with or separate from the inner wall panels 14, 14' and may be glued or otherwise attached to these wall panels. The locking tongue 17 which is foldably connected to the inner wall panel 14' along the score line 18, may also be omitted and replaced by staples driven directly through the upper portions of the panels 14, 14' and through the reenforcing plates 16; and the partition strips 31 which are cut out of the inner walls or panels 14, 14' are inclined as shown in order that they may be formed of proper length so as to span the bottle confining compartments at right angles when the bottle carrier is distended as illustrated in Figs. 4, 5 and 6. These partition strips 31 are preferably removed or cut out of the inner panels 14, 14' in order to avoid perforation or marring of the outer walls 10 which may therefore be used to good advantage for advertising purposes.

The successive cardboard carrier blanks of Fig. 1 may obviously be rapidly produced from suitable stock with the aid of punches and dies, and may thereafter be properly assembled in a simple gluing machine to produce completed and collapsed structures such as shown in Fig. 2, these being adapted to be disposed in compact stacks or bundles for shipping and storage purposes. The successive collapsed cartons may however be quickly and conveniently distended and finally assembled at the beverage bottling plant, and loaded with beverage laden bottles 35 in the following manner. Each assembled blank should be initially distended from the flat condition of Fig. 2, by folding along the lines 23, 24 and thereby spreading the inner wall panels 14, 14' and the inner bottom plate 19 away from the outer wall panels 10 and the outer bottom plate 11 so as to position the end walls 22, 22' and the partition strips 31 perpendicular to the outer and inner wall panels 10, 14, 14', and to provide two bottle receiving compartments each adapted to hold three bottles 35. This initial formation of the two compartments causes the inner bottom plates 19 and the bottom sections 28, 28' to be elevated slightly away from the unscored bottom plate 11.

Figure 3:
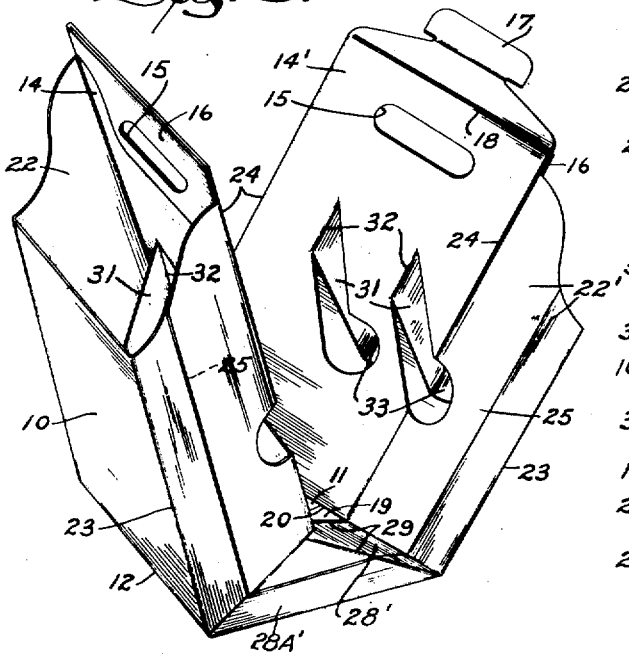
Fig. 3 is a somewhat enlarged perspective view of a partially distended carrier blank of the type shown in Figs. 1 and 2.

The partially distended assemblage may then be folded in the manner illustrated in Fig. 3, along the score lines 12, 20, 27, 29, to cause the inner bifurcated bottom or plates 19 to move downwardly against the outer or lower continuous rigid and unscored bottom plate 11 and to superimpose the two bottle compartments upon the double bottom; and this folding may be facilitated by applying adhesive between the triangular inner bottom areas 27' and the adjacent sections 28. This operation should be continued until the two inner wall panels 14, 14' flatly coact as in Fig. 6, whereupon the locking tongue 17 may be inserted through the hand holes or openings 15 and reversely bent as shown, or staples may be applied to the panels 14, 14' and to the plates 16, so as to lock each carrier in finally assembled condition ready for reception of the bottles 35. The bottles 35 may subsequently be dropped into the two compartments between the partition strips 31 and the adjacent wall panels and will be snugly confined upon the double bottom in orderly position, and may thereafter be carried with the aid of the handle in an obvious manner.

Figure 7:
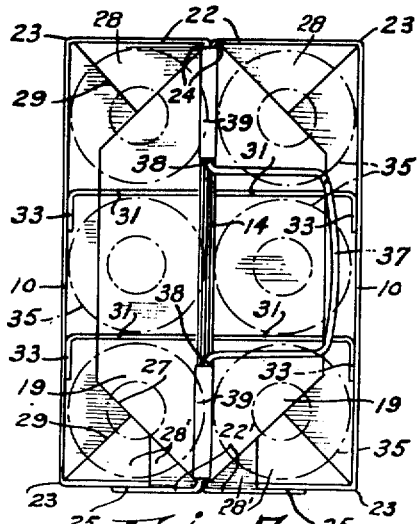
Fig. 7 is a top view of a slightly modified bottle carrier embodying the invention, this modification utilizing a similar cardboard blank but being provided with an adjustable handle adapted to be displaced as shown so as to permit free stacking of the loaded carriers.
Figure 8:
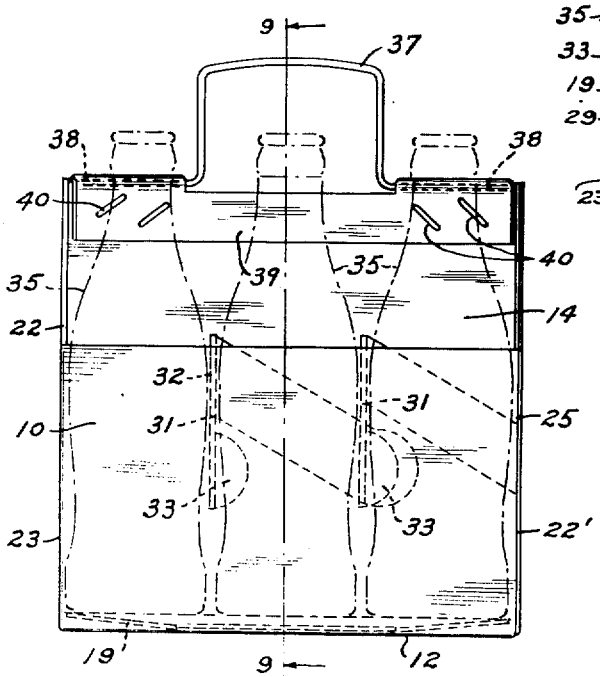
Fig. 8 is a front view of the modified bottle carrier, showing the adjustable handle in active carrying position.
Figure 9:
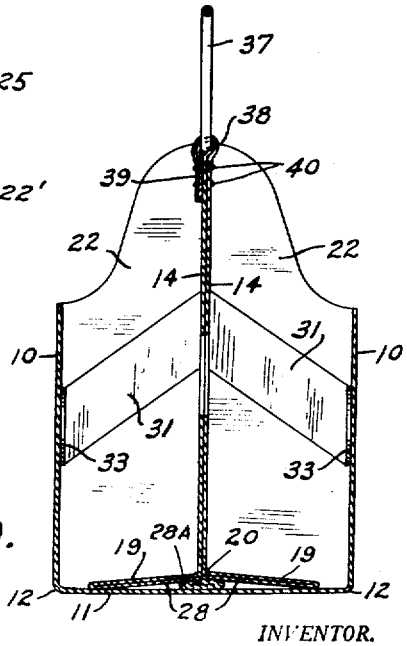
Fig. 9 is a transverse central vertical section through the modified carrier assemblage, taken along the line 9—9 of Fig. 8.

While the unitary handle structure of Figs. 3 to 6 inclusive is entirely satisfactory, it cannot be readily displaced so as to avoid interference when the bottle laden carriers are stacked upon each other. In order to eliminate such possible interference, I may utilize the modified type of carrier handle shown in Figs. 7 to 9 inclusive, wherein the same general type of blank and the same mode of assembly thereof may be employed. However, instead of having a locking tongue 18 associated with an inner wall panel, a separate wire or plastic handle 37, which is provided with alined opposite pivot portions 38, is utilized; and these pivot portions 38 may be confined beneath flaps 39 formed integral with the inner walls or panels 14, by means of staples 40. The flaps 39 have medial cut-outs through which the grip portion of the handle 37 is insertible during the assembling operation, and the two flaps 39 may subsequently be folded over around the handle pivots 38 as clearly shown in Fig. 9 and fastened in folded condition by the staples 40 to simultaneously lock the carrier in assembled condition and to swingably confine the handle. The grip portion of the handle 37 is then free to be disposed either below the caps and heads of the bottles 35 on either side of the inner panels 14 as illustrated in Fig. 7, or in upright carrying position as shown in Figs. 8 and 9, at will, and obviously permits stacking of the bottle laden carriers upon each other without handle interference.

In both of the bottle carriers specifically shown and described, the initially assembled blank may be flatly collapsed as shown in Fig. 2 and piled in compact stacks for storage purposes and preparatory to final assembly. Both carriers may be formed primarily of a single sheet of stock having two outer walls 10 interconnected by an outer unscored rigid bottom 11 and also having two inner walls 14 associated with an inner bottom 19, and provided with opposite end walls 22 connecting the walls 10, 14 to form separate bottle receiving compartments adjoining and swingable upwardly relative to the bottoms 11, 19. When either type of carrier has been finally distended and assembled by positioning the bottle compartments thereof over its bottom panels 11, 19, it may be locked in assembled condition either by a tongue 18 or with the aid of staples 40, and the partition strips 31 will then span their respective compartments at right angles while the inner panels 14 will provide a double suspension wall and the panels 11, 19 will also produce a double supporting bottom for the bottles 35 or other articles applied within the assemblage. All of the end walls 22, 22' as well as the outer walls 10 extend down to and are formed integral with the adjacent bottom panels 11, 19, thus adding considerable strength to the assemblage. The bottles or other articles are freely insertible and removable, and are positively confined in orderly arrangement when disposed within the carriers; and by utilizing an adjustable handle 37, the loaded carrier units may be compactly stacked and stored so as to occupy minimum of space.

From the foregoing detailed description it will be apparent that the present invention provides a new and useful carrier for bottles or other articles, which besides being simple and durable in construction, is also highly effective in use and may be utilized to store and to transport diverse articles such as bottles, cans, eggs and self-contained batches of other commodities. The carrier units may obviously be readily constructed of inexpensive relatively thin cardboard or paper stock with the aid of standard equipment and at moderate cost; and while the blank specifically shown is adapted to be assembled along adhesive areas associated with the sections of an end wall 22', this initial assembly may be effected at other localities if so desired, without departing from the invention. The unique formation and perpendicular final disposition of the partition strips 31 is important as it insures orderly final positioning of the individual bottles 35 or other articles, and the provision of the double suspension wall and flat uncreased supporting bottom provides for great strength and stability, even when relatively light sheet stock is employed in production of the carrier units. The invention has proven highly satisfactory and successful in actual use, and the improved bottle carriers are highly attractive in appearance and present considerable advertising area while still exposing considerable portions of the snugly confined articles to view. It is to be noted that while the outer walls 10 of the carrier specifically shown, are relatively low in order to expose the bottles, it may in some cases be desirable to conceal the confined articles and this may be readily done by merely providing suitable flaps attached to either the outer or inner walls and which are foldable over the tops of the bottles or other articles.

It should be understood that it is not desired to limit this invention to the exact details of construction or to the precise mode of assembly, herein shown and described, for various modifications within the scope of the appended claims may occur to persons skilled in the art. It is also contemplated that specific descriptive terms used herein be given the broadest possible interpretation and meaning, since the improved carrier may obviously be advantageously employed for the purpose of storing and transporting diverse articles.

What I claim is:

1. A bottle carrier comprising, a unitary cardboard structure having two bottle-receiving units each provided with an outer side wall and an inner side wall integrally united with its outer wall by opposite end walls, and a bottom structure for said carrier comprising an upper bottom section formed integral with the lower end of each of said inner walls and having an integral foldable section at opposite ends thereof, each of said foldable sections being integrally connected with the bottom edge of the adjacent end wall of the corresponding unit and a rigid one-piece lower bottom wall formed integral with the lower ends of said outer walls.

2. A bottle carrier comprising, a unitary cardboard structure having two bottle-receiving units each provided with an outer side wall and an inner side wall integrally united with its outer wall by opposite end walls, a partition strip formed integral with the inner side wall of each unit and adhesively united to the outer side wall of said unit, and a bottom structure for said carrier comprising an upper bottom section formed integral with the lower end of each of said inner walls and having an integral foldable section at opposite ends thereof, each of said foldable sections being integrally connected with the bottom edge of the adjacent end wall of the corresponding unit and a rigid one-piece lower bottom wall formed integral with the lower ends of said outer walls.

3. A bottle carrier comprising, a unitary cardboard structure having two bottle-receiving units each provided with an outer side wall and an inner side wall integrally united with its outer wall by opposite end walls, and a bottom structure for said carrier comprising an upper bottom section formed integral with the lower end of each of said inner walls and having an integral foldable section at opposite ends thereof, each of said foldable sections having portions foldable upon each other and being integrally connected with the bottom edge of the adjacent end wall of the corresponding unit and a rigid one-piece lower bottom wall formed integral with the lower ends of said outer walls.

4. A bottle carrier comprising, a unitary cardboard structure having two bottle-receiving units each provided with an outer side wall and an inner side wall integrally united with its outer wall by opposite end walls, and a bottom structure for said carrier comprising an upper bottom section formed integral with the lower end of each of said inner walls and having an integral foldable section at opposite ends thereof, each of said foldable sections having portions foldable upon each other inwardly of said end walls and being integrally connected with the bottom edge of the adjacent end wall of the corresponding unit and a rigid one-piece lower bottom wall formed integral with the lower ends of said outer walls.

5. A bottle carrier comprising, a unitary cardboard structure having two bottle-receiving units each provided with an outer side wall and an inner side wall integrally united with its outer wall by opposite end walls, and a bottom structure for said carrier comprising an upper bottom section formed integral with the lower end of each of said inner walls and having an integral foldable section at opposite ends thereof, each of said foldable sections being integrally connected with the bottom edge of the adjacent end wall of the corresponding unit and a rigid one-piece lower bottom wall formed integral with the lower ends of said outer walls and with all of said foldable sections.

*6. A bottle carrier comprising a unitary cardboard structure having two bottle-receiving open-top units each provided with an outer side wall and an inner side wall, having a hand hole therein, the said hand holes in the side walls being in registry, and each side wall being integrally united with its outer wall by opposite end walls, transverse compartment-forming partitions in each of the units which along with the inner side wall and end wall portions define an end compartment at each end of each unit, a substantially rigid one-piece bottom wall integral with the lower ends of said outer walls, a foldable section at each end of the bottom wall consisting of adjacent foldably connected intermediate and end triangularly shaped flaps, the intermediate flap being connected to the bottom wall and the end flaps to the end walls, and each intermediate flap being in fact contacting relation to the adjacent interior bottom wall with the end flaps superposed thereon and with one end flap disposed only in the bottom of each end compartment of each unit.*

*7. A bottle carrier comprising a unitary cardboard structure having two bottle-receiving open-top units each provided with an outer side wall and an inner side wall, which inner side walls are in contacting relationship throughout and each inner side wall having a hand hole therein, the said hand holes in the side walls being in registry, each side wall being integrally united with its outer wall by opposite end walls, transverse compartment-forming partitions in each of the units which along the inner side wall and end wall portions define an end compartment at each end of each unit, a substantially rigid one-piece bottom wall integral with the lower ends of said outer walls, a foldable section at each end of the bottom wall consisting of adjacent foldably connected intermediate and end triangularly shaped flaps, the intermediate flap being connected to the bottom wall and the end flaps to the end walls, and each intermediate flap being in face contacting relation to the adjacent interior bottom wall with the end flaps superposed thereon and with one end flap disposed only in the bottom of each end compartment of each unit.*

*8. A bottle carrier comprising a unitary cardboard structure having two bottle-receiving open-top units each provided with an outer side wall and an inner side wall, which inner side walls are in contacting relationship throughout and each inner side wall having a hand hole therein, the said hand holes in the side walls being in registry, each side wall being integrally united with its outer wall by opposite end walls, the said end walls of one end of the carrier consisting of extensions from the inner and outer walls with the edge portions of the extensions in overlapped permanently secured together relationship and serve along with the other end walls to maintain the inner and outer walls in substantially parallel spaced relationship, transverse compartment-forming partitions in each of the units which along with inner and side wall and end wall portions define an end compartment at each end of each unit, a substantially rigid one-piece bottom wall integral with the lower ends of said outer walls, a foldable section at each end of the bottom wall consisting of adjacent foldably connected intermediate and end triangularly shaped flaps, the intermediate flap being connected to the bottom wall and the end flaps to the end walls, and each intermediate flap being in face contacting relation to the adjacent interior bottom wall with the end flaps superposed thereon and with one end flap disposed only in the bottom of each end compartment of each unit.*

STEPHEN LIGHTER.

(References on following page)

REFERENCES CITED

The following references are of record in the file of this patent:

UNITED STATES PATENTS

| Number | Name | Date |
|---|---|---|
| 1,799,657 | Tinsley | Apr. 7, 1931 |
| 2,126,407 | Payne et al. | Aug. 9, 1938 |
| 2,162,094 | Mahone | June 13, 1939 |
| 2,163,290 | Powell | June 20, 1939 |
| 2,213,151 | Symonds | Aug. 27, 1940 |
| 2,316,186 | Powell | Apr. 13, 1943 |
| 2,322,396 | Slevin, Jr. | June 22, 1943 |

| Number | Name | Date |
|---|---|---|
| 2,333,560 | Gray | Nov. 2, 1943 |
| 2,375,056 | Wesselman | May 1, 1945 |
| 2,384,480 | Lupton | Sept. 11, 1945 |
| 2,389,318 | Lebold | Nov. 20, 1945 |
| 2,395,711 | Arnold | Feb. 26, 1946 |
| 2,402,219 | Wesselman | June 18, 1946 |
| 2,417,421 | Koolnis | Mar. 18, 1947 |
| 2,419,842 | Lebold | Apr. 29, 1947 |
| 2,432,481 | Lyons, Jr. | Dec. 9, 1947 |
| 2,458,281 | Lupton | Jan. 4, 1949 |
| 2,460,229 | Lebold | Jan. 25, 1949 |